July 23, 1929. P. W. DALRYMPLE 1,721,659
MACHINE FOR USE IN THE MANUFACTURE OF BOTTLE CAPS
Filed April 30, 1927 4 Sheets-Sheet 3
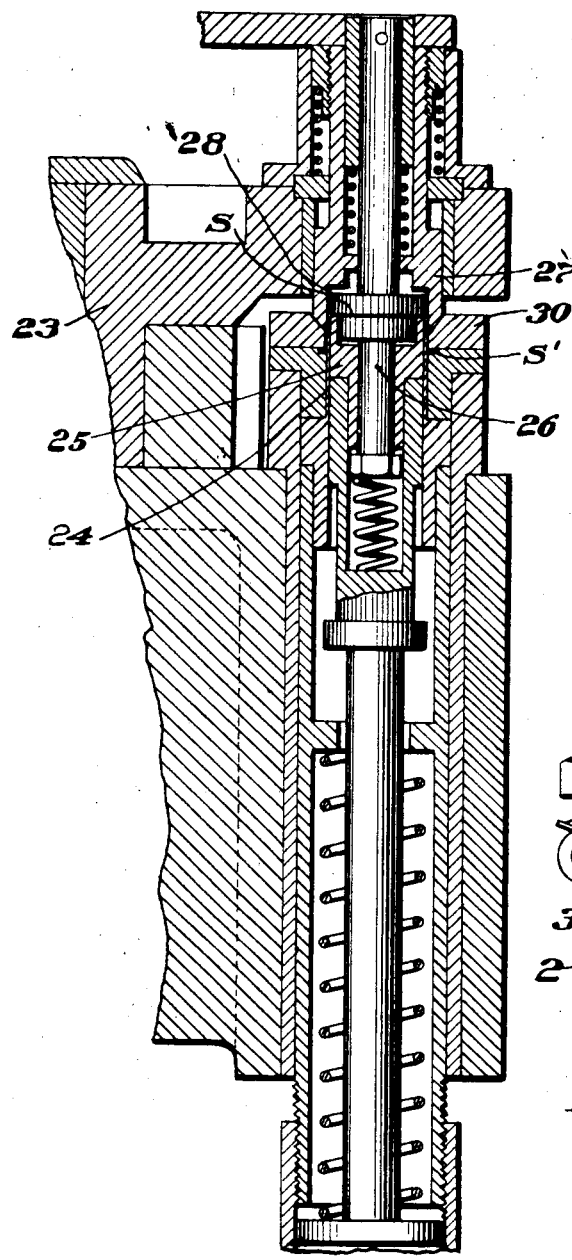
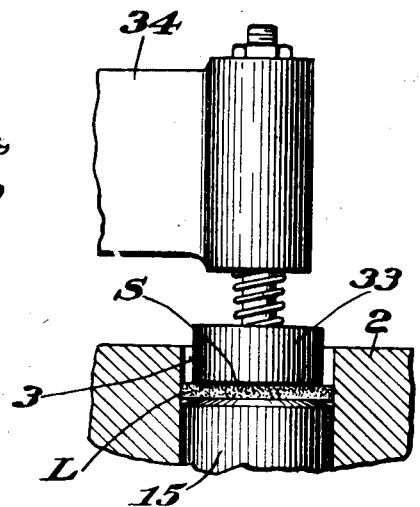
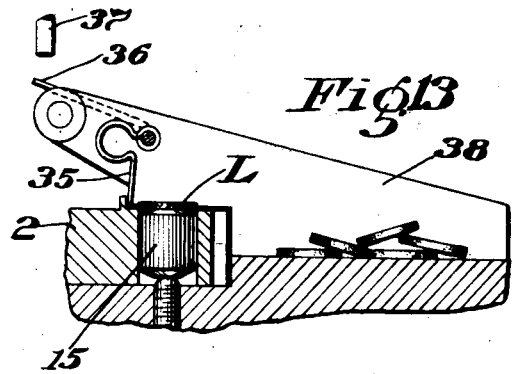
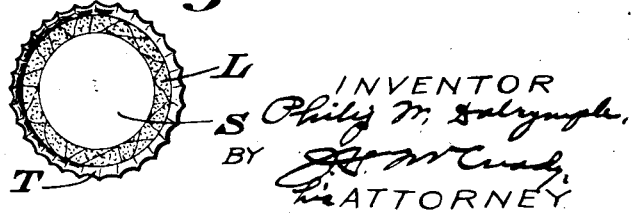
INVENTOR
Philip W. Dalrymple,
BY
ATTORNEY INVENTOR:
Philip W. Dalrymple,
BY
ATTORNEY Patented July 23, 1929.

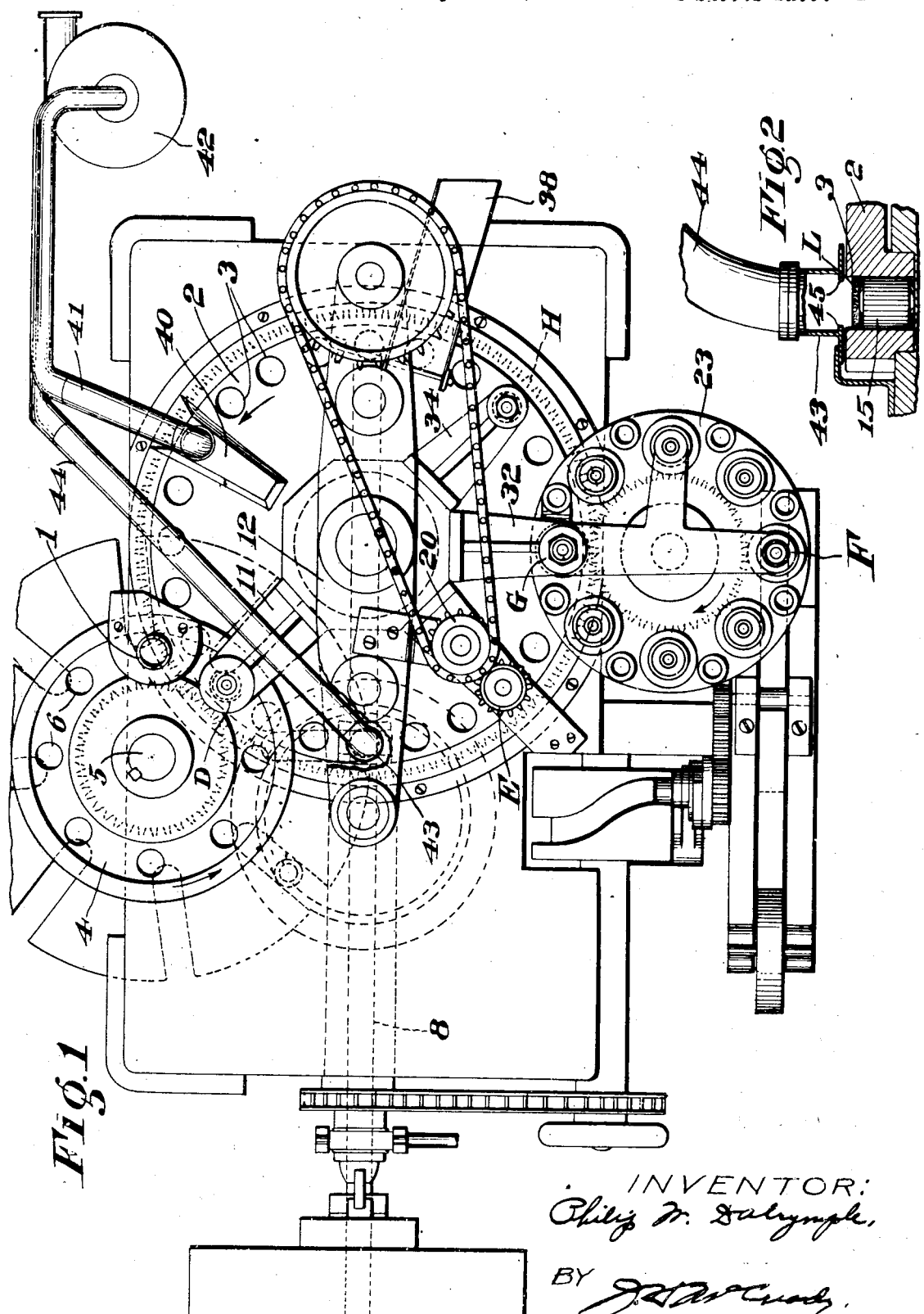

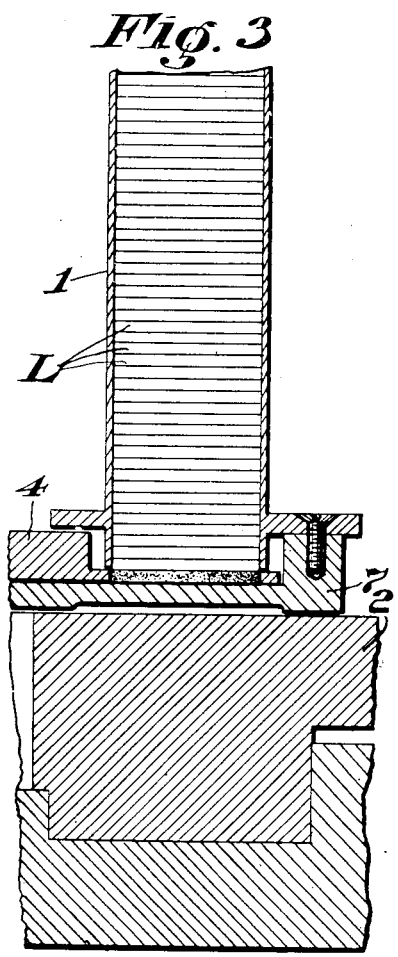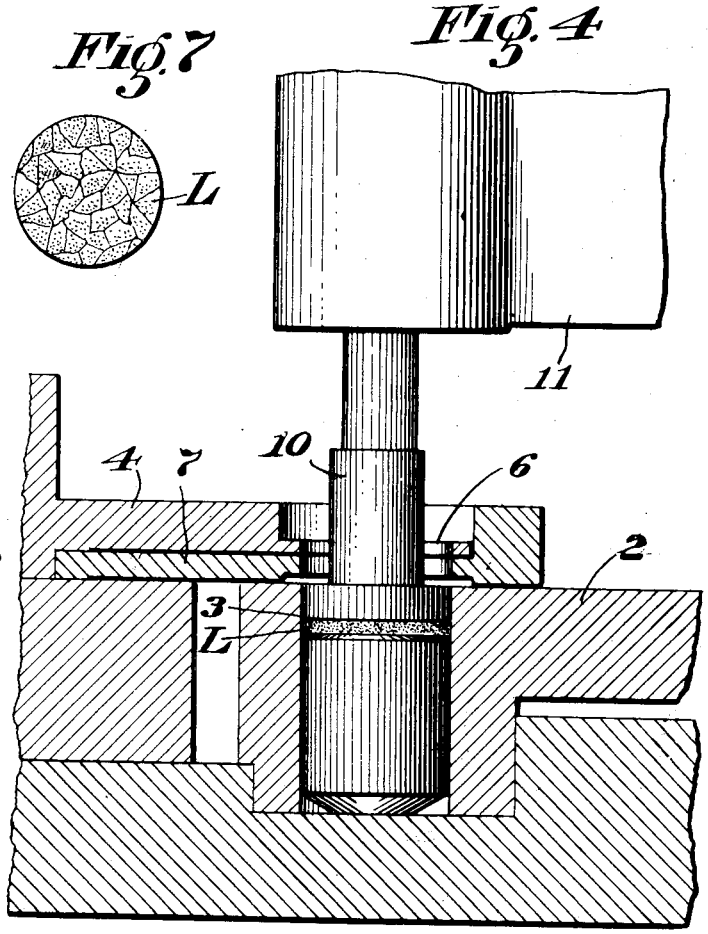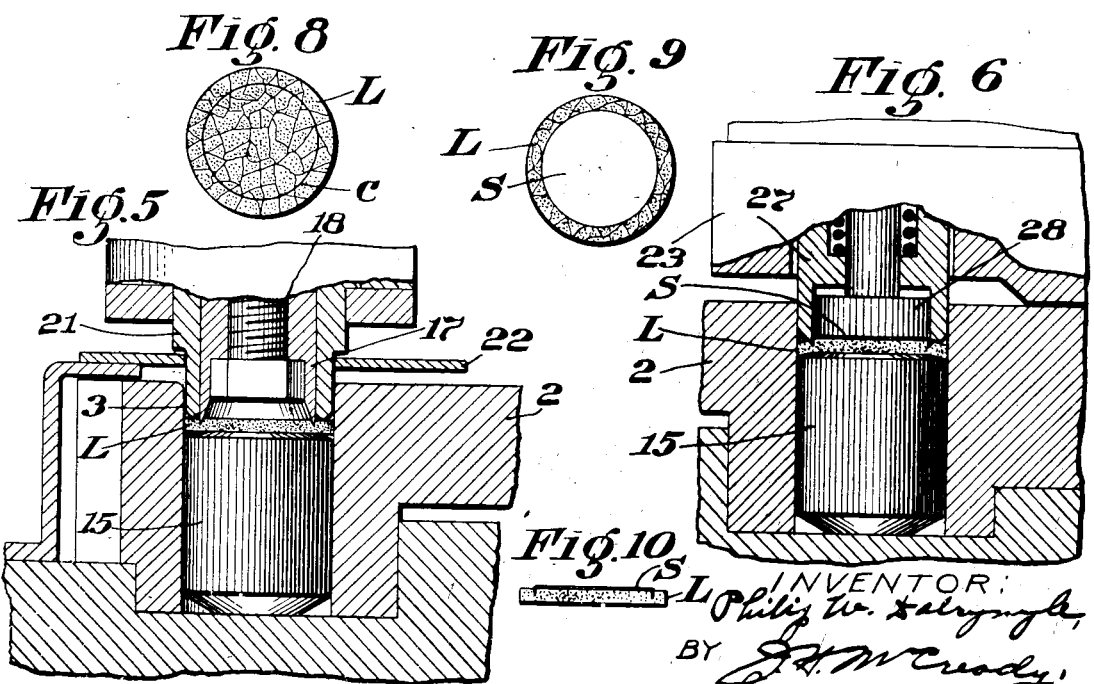

1,721,659

UNITED STATES PATENT OFFICE.

PHILIP W. DALRYMPLE, OF NEWTON, MASSACHUSETTS, ASSIGNOR, BY MESNE ASSIGNMENTS, TO WHITE ROCK MINERAL SPRINGS COMPANY, OF WAUKESHA, WISCONSIN, A CORPORATION OF WISCONSIN.

MACHINE FOR USE IN THE MANUFACTURE OF BOTTLE CAPS.

Application filed April 30, 1927. Serial No. 187,970.

This invention relates to machines for and processes of making bottle caps or crowns. The invention is especially concerned with the manufacture of that type of crown or cap in which the lining carries a disk-like seal or protecting member which closes the mouth of the bottle when the crown is applied and prevents the liquid contents of the bottle from coming in contact with the lining of the crown. These disk-like seals are usually, although of course not necessarily, made of tin foil, and crowns of this type, therefore, are commonly called "tin center" crowns.

A machine which has been used very successfully in the manufacture of crowns of this type is shown in the Berg patent No. 1,477,418 granted December 11, 1923. This machine includes means for making a circular cut or score in the lining, mechanism for making a seal from metal foil and the like, this seal being provided with a short marginal flange, and means for subsequently forcing the flange of the seal into the cut or score formed in the lining. Due to the fact that the material from which the seals are made is relatively delicate, some difficulty is experienced in inserting the flange of the seal in the cut or score, and this difficulty is greatly increased in operating on crowns in which a composition cork lining is used.

The present invention deals especially with this problem. It aims to improve both the processes of making crowns of the general type above designated, and also the machines used in the manufacture of such crowns, with a view to reducing the expense of manufacture of crowns of this type, reducing the percentage of imperfect crowns produced, and devising a thoroughly practical way of applying the seals or tin centers to composition cork linings.

The nature of the invention will be readily understood from the following description when read in connection with the accompanying drawings, and the novel features will be particularly pointed out in the appended claims.

In the drawings,

Figure 1 is a plan view of a machine constructed in accordance with this invention;

Fig. 2 is a vertical cross-sectional view through a part of the turret or carrier of the machine shown in Fig. 1 showing a suction attachment;

Figs. 3, 4, 5 and 6 are vertical, cross-sectional views, partly in elevation, showing different steps in the process provided by this invention;

Figs. 7, 8 and 9 are plan views of a bottle cap lining showing successive steps of this process;

Fig. 10 is a vertical cross-sectional view of the lining shown in Fig. 9;

Fig. 11 is a cross-sectional view showing the mechanism for forming the seal;

Fig. 12 is a side elevation, partly in cross-section, showing the means for pressing the seal upon the lining;

Fig. 13 is a side elevation, partly in cross-section, showing the ejecting means for the linings;

Fig. 14 is a plan view of a completed crown or cap;

Figure 15:
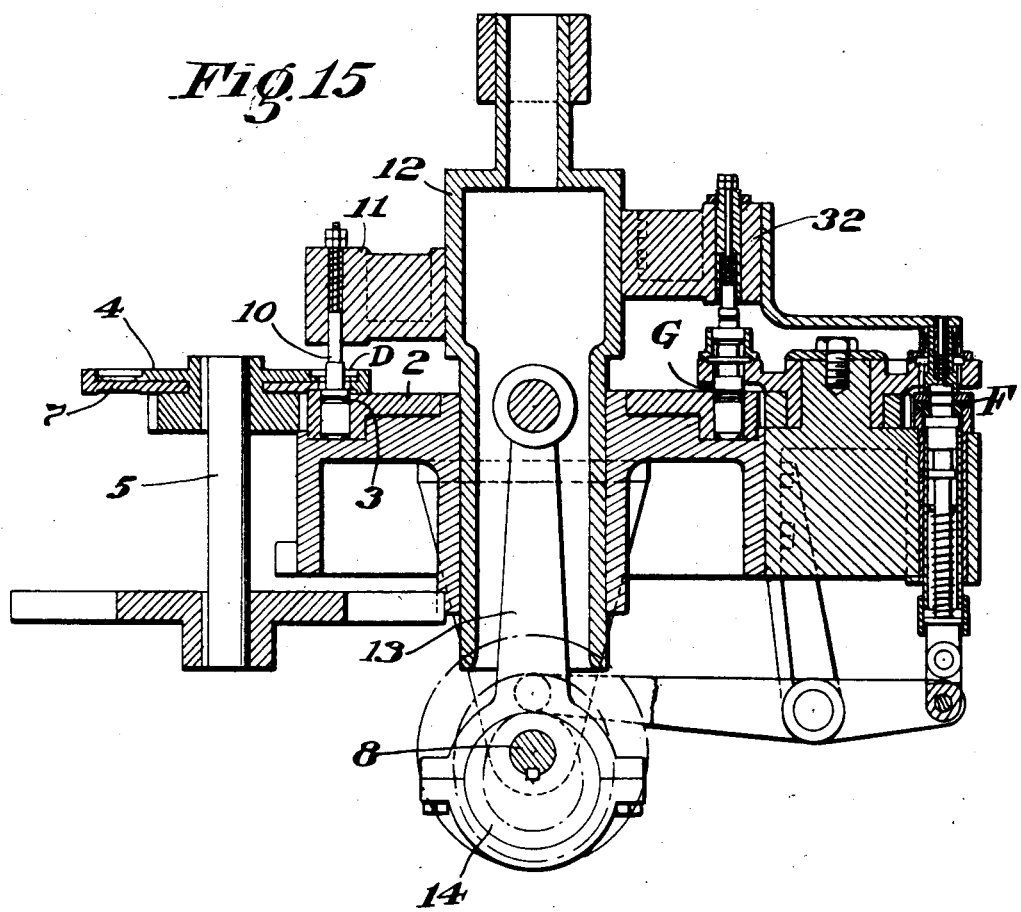
Fig. 15 is a vertical cross-sectional view through the turret or carrier of the machine shown in Fig. 1 and the parts adjacent thereto.

The machine shown in the drawings resembles closely that shown in the Berg patent above designated, and reference should be made to that patent as to various constructional features. The drawings herewith have been confined chiefly to those features of the machine with which this invention is more especially concerned, no attempt being made to illustrate the entire machine.

The present process differs from that performed by the Berg machine in that the seal is first applied to the lining and subsequently the lining is assembled in the metal shell of the crown. Referring to Figs. 7, 8, 9 and 10 it will be observed that a lining of the ordinary composition cork type is shown at L, Fig. 7. This lining is first scored or has a circular cut C made therein, as shown in Fig. 8, and then the seal S, Figs. 9 and 10, is applied to this lining, the flange of the seal being inserted in the cut C.

Subsequently these linings, with the seal applied to them, may be transferred to an assembling machine of the ordinary commercial type, and each lining is secured in a sheet metal shell T, Fig. 14, thus producing the completed crown as shown in said figure.

The machine shown comprises a rotary table or carrier 2 provided with a series of pockets 3 each adapted to receive a lining. (See Figs. 1, 4 and 15.) The linings L are stacked in a stationary magazine and are fed out of it by a rotary feed disk 4 mounted on the upper end of a shaft 5, the disk being provided with holes 6 into which the linings drop one at a time from the magazine. This disk rotates immediately above a stationary plate 7, Figs. 3, 4 and 15, and the disk and carrier 2 are geared together and are rotated step by step through connections (not shown) which are driven from the main shaft 8. The timing is such, as fully explained in the Berg patent, that at each pause in the rotation of the feed disk and carrier, one of the apertures 6 in the disk is in alinement with one of the pockets 3 in the carrier, as clearly shown in Fig. 4. At this instant a plunger 10, Fig. 4, descends and forces the lining L into the pocket 3, and this operation is repeated with each cycle of the machine.

The plunger 10 is mounted on an arm 11 which is secured to a head 12 that is reciprocated by an eccentric strap 13, Fig. 15, operated by an eccentric 14 on the main shaft 8.

Figure 16:
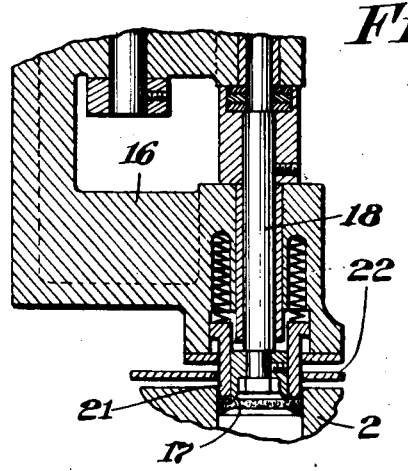
Fig. 16 is a cross-sectional view showing certain details of the mechanism for scoring the lining.

After leaving the loading station the linings are transferred into the pockets of the carrier 2 and are next brought under a rotary cutter which makes the circular score or cut C, Fig. 8. This cutting mechanism, as well a all of the mechanism so far described except the magazine, is constructed, arranged, and operated substantially as disclosed in the Berg patent, with the further exception of certain details of the cutting mechanism best shown in Fig. 5. It will be noted that each pocket 3 consists of a cylindrical hole formed in the table 2, and that the bottom of the pocket is formed by the upper surface of a plug 15, Fig. 5. This plug or block has a flat central portion to support the central part of the lining L, but the margin of the upper face of this plug is bevelled or cut away so as to leave the margin of the lining unsupported. The scoring mechanism is mounted on an arm 16, Fig. 16, which reciprocates with the head 12, and it comprises a rotary cutter 17, Figs. 5 and 16, fast on the lower end of a shaft 18, this shaft being revolved by connection with the sprocket wheel 20, Fig. 1, as described more fully in the Berg patent. Encircling the cutter 17 is a tubular non-rotary plunger or sleeve 21 which is pressed downwardly by springs 22, Fig. 16. The lower face of this sleeve is of angular formation, as shown in Fig. 5, and when the cutting mechanism is moved downwardly to score the cork lining L, the lower edge of the plunger 21 engages the lining far enough in advance of the edge of the cutter 17 to bend the lining into a convex form. This tensions the upper surface of the lining so that when the edge of the cutter comes in contact with it, the tensioned surface cuts very easily and a clean cut of substantially uniform depth thus is assured. The lining is held stationary during this operation. In order to prevent the lining from being lifted out of the pocket by the cutter as it rises, a stationary stripper plate 22 is provided, this plate having an aperture of slightly smaller diamter than the pocket 3 and being in approximately axial alinement with the pocket.

The carrier 2 next transfers the scored lining to another station where the seal, in this case in the form of a so-called "tin center," is applied. The mechanism for making this seal from a strip of metal foil is fully shown and described in the Berg patent above designated. A part of this mechanism is shown in Figs. 1 and 11. It comprises a rotating table 23 geared to the carrier 2 and a feed mechanism which advances the strip of foil through the slot S', Fig. 11, where a circular disk is cut from it by the upward movement of the sleeve 24 and plungers 25 and 26. A further upward movement of the parts 25 and 26 carries this disk into a sleeve 27 which, with the plunger 28, acts as a holder for the seal. As the disk is moved upwardly through the aperture in the part 30, a marginal flange is formed on it. This operation takes place at the station F, Fig. 1, and the seal is retained in the holder 27 while it is transferred by the table 23 to the applying station G, Fig. 1, all of this mechanism, including that required to produce the seal applying movement, being fully described in the Berg patent.

Referring to Fig. 6 which illustrates the seal applying operation, it will be observed that the lower end of the sleeve 27 is made substantially like the corresponding part of the plunger 21 above referred to. Also, that this sleeve is held downwardly by spring pressure in a position below the plunger 28. Consequently, when the arm 32, Figs. 1 and 15, which is rigid with the head 12, is moved downwardly by the head, the lower edge of the plunger or sleeve 27 strikes the margin of the scored lining L, Fig. 6, and bends this lining into a convex shape which results in opening the score or cut previously made in the lining. The further downward movement of the arm 32 presses the plunger 28 down and causes it to force the flange of the seal S, Fig. 6, into the cut which is now held open. Thereafter, as the plunger 28 and sleeve 27 rise, the lining is released and it closes the cut due to its own resiliency. This action results in clamping the flange of the seal S firmly in the lining. Due to the fact, however, that the cut has been opened to receive the seal, any danger of mutilating or deforming the flange of the seal during the inserting operation is practically eliminated. This invention, therefore, effectually overcomes the most serious source of trouble heretofore encountered in applying the seals to the linings.

The carrier 2 next transfers the lining with the seal anchored thereon to the station H, Figs. 1 and 12, where the plunger 33 carried by the arm 34 presses the seal and lining together and serves further to seat the seal in the lining.

Subsequent movements of the carrier 2 transfer the lining to the ejecting station where the plug or block 15, Fig. 13, is lifted far enough to raise the lining above the surface of the carrier 2. In this position the lining is struck by an ejecting finger 35 having a tail piece 36 which is operated by a plunger 37 mounted on the head 12, the ejector 35 operating to kick the linings into a chute 38.

The linings' with the seals or tin centers fixed to them may now be transferred to an assembling machine of any suitable type which will place the linings in the metal shells of the crowns and complete the manufacture of the crowns or caps.

In the normal operation of a machine of this type, particularly when composition cork linings are used, the carrier 2 becomes partly covered with small pieces of cork which interfere with the proper operation of the machine. In order to remove such material I have placed a hood 40, Fig. 1, immediately over the carrier 2 with its mouth close to the upper surface of said carrier, and this hood is connected through a flexible pipe 41 with the intake end of a suction fan or blower 42. Preferably this hood is located at a point between the ejecting and loading stations so that the pockets and surface of the carrier are cleared of particles of cork before the pockets reach the loading station. It may happen, also, that a broken lining will be transferred to the carrier 2, and I prefer, therefore, to locate another hood 43, Figs. 1 and 2, immediately over the carrier and in such a position that the pockets will pass under it as they travel from the loading station D to the scoring station E. This hood is also connected by a flexible pipe 44 to the intake end of the suction blower 42. In addition, the hood is provided with inwardly projecting parts 45 which slightly overlie the opposite edges of the pocket 3. The suction tends to lift the disk L out of the pocket, but if the disk is of proper shape and size, the projections 45 will effectually prevent such action. On the other hand, if the disk should be broken or much under size, it would be pulled out of the pocket by the suction and discharged from the machine. This suction apparatus thus contributes to reliability of operation and avoids interruptions which otherwise might often occur.

The invention effects economies in the manufacture of crowns or caps of the so-called tin center type, both by substantially eliminating the production of imperfect crowns and also by providing a thoroughly practical method of applying seals to a less expensive grade of lining material than has been used successfully heretofore in crowns of this construction. According to prior methods the seals were applied to a crown on which all the other manufacturing operations had been completed so that if the lining was damaged in the application of the seal, the entire crown usually became a total loss. According to the present method, however, the seals are first applied to the linings, and if an imperfect product is produced in this step of the process, the lining and seal only are lost.

It should be noted that in assembling these linings with the shells in an assembling machine of the ordinary commercial type it is necessary to use a magazine in which the linings can be stacked right side up.

While I have herein shown and described the embodiment of my invention which I prefer at present, it will be understood that the invention may be embodied in other forms, and that the process may be practiced by other apparatus without departing from the spirit or scope of the invention.

Having thus described my invention, what I desire to claim as new is:

1. In a machine of the character described, the combination of a support for a bottle cap lining shaped to engage one face of the lining at a short distance from the edge thereof but being constructed to leave the margin of the lining unsupported, a plunger for engaging the marginal portion of the opposite face of said lining and bending the lining over the edge of said support, and means for scoring said opposite face of the lining along said edge of the support.

2. In a machine of the character described, the combination of a support for a bottle cap lining, a plunger for engaging the margin of said lining opposite to said support, said support and plunger cooperating to bend the lining into an approximately convex form whereby a zone on the convex surface is tensioned, and means for scoring said tensioned zone to form a self-opening slit therein.

3. In a machine of the character described, the combination of a support for a bottle cap lining and a plunger for engaging the margin of said lining opposite to said support, said support and plunger cooperating to bend the lining into an approximately convex form and thereby tension the convex surface of the lining, and means for scoring the latter surface of the lining where it is held so convexed and at the zone of tension.

4. In a machine of the character described, the combination of a support for a bottle cap lining, a plunger for engaging the margin of said lining opposite to said support, said support and plunger cooperating to bend the lining into an approximately convex form and thereby tension the convex surface of the lining, and a rotary cutter cooperating with said plunger to make a circular cut in the tensioned surface of the lining and partly through the lining while it is held so tensioned.

5. In a machine of the character described, the combination of parts cooperating to bend a bottle cap lining having a circular cut in one surface thereof to open said cut, and means for relatively moving said lining and a seal having a circular flange to force said flange into said cut while said cut is held open.

6. In a machine of the character described, the combination of a support for a bottle cap lining, a plunger for engaging the margin of said lining opposite to said support, said support and plunger cooperating to bend the lining into an approximately convex form and thereby tension the convex surface of the lining, and a rotary cutter mounted inside said plunger and in telescoping relation thereto for scoring the latter surface of the lining while it is held so convexed.

7. In a machine of the character described, the combination of a carrier constructed to support a series of bottle cap linings, said carrier being movable to transfer the linings successively from one station to another, means operable at one of said stations to score the linings, and mechanism operable at another station to bend each lining so scored to open the score and to insert the flange of a seal into the score so opened.

8. In a machine of the character described, the combination of a carrier having a series of pockets, each constructed to receive a bottle cap lining, said carrier being movable to transfer each lining from one station to another, means operable at one of said stations to bend each lining to tension one surface thereof and to make a circular cut in the latter surface while the lining is held so tensioned, and mechanism operable at another station to bend each lining previously operated upon to open said cut and to insert the flange of a seal in the cut while it is held open.

9. In a machine of the character described, the combination of means for bending a bottle cap lining having a circular cut in one face thereof to open said cut, said means comprising a support for the lining having a raised central portion and a bevelled margin and a plunger for engaging the margin of the opposite face of said lining and forcing it toward said bevelled surface, seal applying means operable to insert the flange of a seal into said open cut, and means for delivering seals one at a time to said applying means.

10. In a machine of the character described, the combination of a carrier constructed to support a series of bottle cap linings, said carrier being movable to transfer the linings successively from one station to another, mechanism for operating on the linings at said stations, and suction means for removing chips and the like from the carrier and acting at a point where the carrier has been relieved of the cap linings.

11. In a machine of the character described, the combination of a carrier having a series of pockets, each constructed to receive a bottle cap lining, said carrier being movable to transfer each lining from one station to another, means for operating on the linings held in said pockets, suction means operable to remove lining pieces from said pockets, and means for holding perfect linings in the pockets against the action of said suction means but inoperative to hold pieces of the linings.

PHILIP W. DALRYMPLE.